March 11, 1941.  O. P. CROUSE  2,234,623
CONTROL DEVICE
Filed June 21, 1939
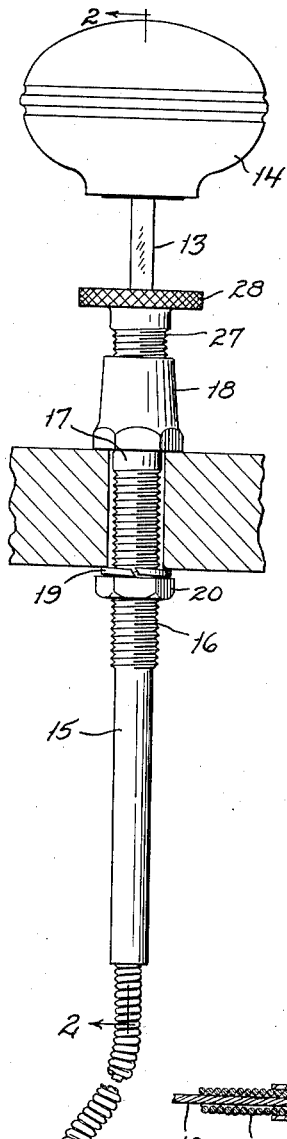
Fig. 2
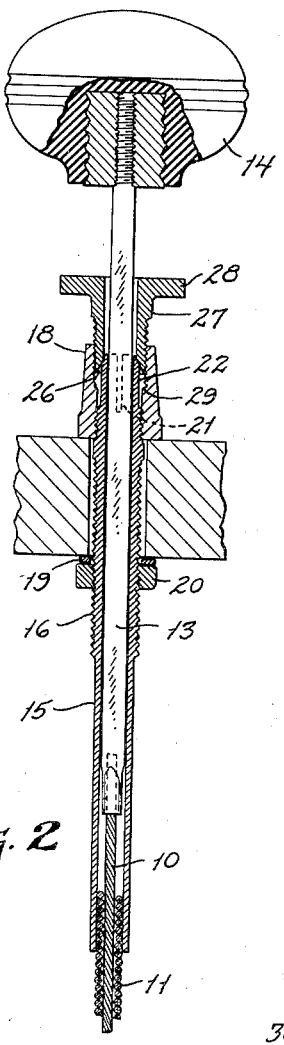
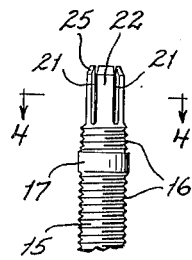
Fig. 3
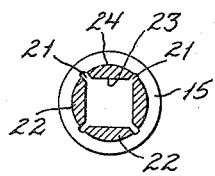
Fig. 4
Fig. 5
Fig. 1
INVENTOR.
Oliver P. Crouse
BY
Frank M. Slough
HIS ATTORNEY.

Patented Mar. 11, 1941

2,234,623

UNITED STATES PATENT OFFICE 2,234,623

CONTROL DEVICE

Oliver P. Crouse, Mansfield, Ohio, assignor to The Richland Auto Parts Company Inc., Mansfield, Ohio, a corporation of Ohio Application June 21, 1939, Serial No. 280,290

5 Claims. (Cl. 74—502)

This invention relates to control devices primarily adapted to the control of carburetors and the like, and more particularly to improved means for maintaining the control rod of such device in an adjusted position.

Control devices of this general type are commonly mounted on the instrument board or dash and a handle conveniently accessible to the operator is employed to effect longitudinal movement of a control rod to actuate an element at a point remote from the handle such as the choke valve of a carburetor.

Although the control rod should normally be freely movable by the operator, it is highly desirable that means be provided for locking the rod in an adjusted position to prevent axial movement due to vibration, shock and the like. This is particularly true when such control devices are used on aircraft where vibration or landing shock may tend to move the control rod.

I am aware that it has heretofore been proposed to employ locking means with control devices of this type wherein packing friction materials frictionally engage the control rod to prevent movement thereof. However, such prior devices with which I am familiar employ a considerable number of parts resulting in a relatively expensive construction, or the packing material is not of such a nature as to be sufficiently self-retracting upon release of pressure imposed by the locking means employed.

I have devised a control device of the above general type which is of relatively simple construction, requiring relatively few parts, and wherein the wedging means is self-retracting upon release of the locking means.

It is a primary object of my invention to provide an improved control device for carburetors and the like.

Another object of my invention is to provide a control device of the above type having improved locking means for maintaining the control rod in an adjusted position.

Another object of my invention is to provide improved control mechanism for carburetors and the like which is relatively simple and economical of construction.

Other objects of my invention and the invention itself will become increasingly apparent from a consideration of the following description and drawing wherein:

Fig. 1 is a side elevational view of my improved control device;

Fig. 2 is a fragmentary longitudinal section taken along line 2—2 of Fig. 1;

Fig. 3 is an elevational view of the upper portion of a support member I may employ;

Fig. 4 is a transverse section taken along 4—4 of Fig. 3, and

Fig. 5 is a longitudinal section taken along 5—5 of Fig. 1.

Referring to the drawing, I have indicated generally at 10 a control wire which is encircled for a substantial portion of its length by a Bowden tube or supporting sheath 11. The wire 10 at its outer end is extended beyond the sheath 11 and is preferably encased by a sheath 12 formed from a generally metallic tubing and secured to the wire 10 to maintain said portion of wire 10 relatively rigid; the outer end being connected in any suitable manner to the device to be controlled (not shown). The inner or handle end of the wire 10 is connected in any suitable manner to a rod 13 as by projecting the wire end within a recess formed in the outer end of the rod and soldering or otherwise integrally securing the rod and the wire.

Secured to the inner end of the rod 13 which is preferably externally screw threaded as shown, is a generally spherical handle 14 preferably formed of molded or Bakelite composition, the rod being secured in any suitable manner as by bonding an internally threaded metal tube centrally of the handle and threading the rod thereinto. The rod 13 is preferably square in cross-section and is slideably supported in an element 15 provided with a square bore and an externally threaded portion 16 which is preferably interrupted by a non-threaded shoulder 17.

The support element 15 is rigidly secured to the instrument panel or dash by projecting the element through the panel and threading an internally threaded sleeve 18 on the inner end portion of element 15 to engage the inner side of the panel and providing a lockwasher 19 to engage the outer side of the panel; the lock washer being secured by a nut 20. The shoulder 17 provided on element 15 limits outward movement of sleeve 18 to dispose element 15 in a desired relation to the instrument panel.

The inner end of element 15 is provided with open-ended slots 21 preferably four in number, to provide four resilient fingers 22 having flat inner faces indicated at 23 and arcuate outer faces 24, the slots preferably extending to the threaded portion 16. I preferably provide a non-circular bore in support element 15 and form rod 13 to prevent rotation of the rod 13 and its associated wire 10, but it is understood that various shaped rods may be used, such as a rod triangular or hexagonal in cross-section.

The inner ends of fingers 22 are conically tapered, as indicated at 25, to engage an internal conical seat 26 formed in a socket element 27, which is externally threaded to engage the internal threads of the sleeve 18 and is provided with a knurled flange 28 for rotating the socket element. As will be noted by reference to Fig. 2, I preferably form the internal threaded portion of the sleeve 18 engaging the socket element 27 larger in diameter than the threaded portion thereof engaging support element 15 and thus provide a limiting shoulder 29 therebetween.

It will now be apparent that when the rod 13 is moved to a desired position, it may be locked in said position by rotating the socket element 27 and effect axial outward movement thereof to cause the seat 26 thereof to engage and tend to ride over the fingers 22, thereby forcing the fingers radially inwardly to frictionally clamp rod 13 therebetween and prevent accidental movement of the rod. It will also be apparent that the frictional effect can be controlled dependent upon the rotational effort applied to the socket element 27 whereby accidental movement of the rod because of vibration of the mechanism or the like may be prevented while permitting rod movement by manual force applied to the handle 14 or that the rod may be substantially locked against movement by manual force applied to the handle.

Upon rotating the socket element 27 out of engagement with the fingers 22, the inherent resiliency of the fingers will cause them to move radially outwardly out of engagement with rod 13 and this self-retracting movement insures that no accidental wedging will occur to impair free movement of the rod. In assembling the device, the wire 10 and rod 13 may be projected through support element 15 and its associated parts and the wire 10 through the Bowden tube 11 and thence into a tube 30 with sheath 12 extended beyond tube 30. The inner end of the Bowden tube 11 is adapted to be received within the bore of the support element 15 and the outer end thereof is adapted to be received within an enlarged recess provided in said tube 30, as indicated at 31. Tube 30 will be supported in any suitable manner adjacent the device to be controlled and thus Bowden tube 11 will be maintained in assembled relation with support element 15 and tube 30. The sheath 12 which encases the outer end of wire 10 is preferably of sufficient length to ensure that no exposed portion of the wire 10 will extend beyond the tube 30, within the range of movement of the control device, and thus any tendency for the outer end of wire 10 to "kink" or bend will be eliminated.

It will now be understood that I have provided a control device which is relatively simple of construction and assembly and that the provision of clamping means comprising an integral part of the support element results in a minimum number of parts.

Although I have shown and described a preferred form of my invention, I contemplate that numerous and extensive departures may be made therefrom without departing from the spirit of my invention and the scope of the appended claims.

I claim:

1. In a control device, the combination of a tubular support having a plurality of resilient projections with beveled outer faces adjacent one end thereof and an angular shaped bore, a control rod having flat faces and being longitudinally movable in said bore but non-rotative relative thereto, a socket element movable with respect to and having a bore which loosely receives said rod and a beveled portion, the beveled portion of said socket element being adapted to engage the beveled portion of the resilient projections and force them radially inwardly against the sides of said rod to restrict or prevent longitudinal movement of said rod with respect to said support when said socket element is moved in one direction upon said control rod.

2. In a control device, the combination of a tubular support having a plurality of resilient projections, a control rod longitudinally movable in the bore of said support, a sleeve having a portion mounted on said support and a portion spaced from said projections, and a socket element movable with respect to and having a bore which loosely receives said rod, said socket element having a portion which is adapted to extend between said sleeve and said support and engage said projections when the socket element is moved in one direction on said rod, the engaging portions of said socket element and said projections being shaped to cause said socket element to radially move said projections against said rod during movement of the socket element in one direction, thereby restricting or preventing longitudinal movement of said rod with respect to said support.

3. In a control device, the combination of an exteriorly threaded tubular support having a plurality of resilient projections with beveled outer surfaces at one end thereof, a control rod longitudinally movable in the bore of said support, a sleeve having a portion threaded to said support and an interiorly threaded portion spaced from said projections, and an exteriorly threaded socket element rotatably mounted on said sleeve and having a beveled portion which is adapted to engage the beveled portion of said projection and force them radially inwardly into engagement with said rod to restrict or prevent longitudinal movement of said rod relative to said support when the socket element is rotatably threaded upon said sleeve.

4. In a control device, the combination of an exteriorly threaded tubular support having a plurality of resilient projections with beveled outer surfaces at one end thereof and an angular shaped bore, a control rod having flat faces and being longitudinally movable in said bore but non-rotative relative thereto a sleeve having a portion threaded to said support and a threaded portion spaced from said projections, and an externally threaded socket element rotatably threaded on said sleeve and having a beveled portion, the beveled portion of said socket element being adapted to engage the beveled portion of the resilient projections and force them radially inwardly against the sides of said rod to restrict or prevent longitudinal movement of said rod with respect to said support when said socket element is rotated in one direction on said sleeve.

5. In a control device, the combination of an instrument panel having an aperture therein, a tubular support arranged in said aperture having a shoulder with an inner surface flush with the interior of said panel, an exteriorly threaded portion and a plurality of resilient projections extending inwardly of said panel, a control rod longitudinally movable in said support, a sleeve having a portion threaded to the exteriorly threaded portion of said support, a portion spaced from said projections and a base portion resting partially upon said shoulder and partially against the interior of said panel, a socket element movable with respect to and having a bore which loosely receives said rod, said socket element having a portion which is adapted to extend between said sleeve and support and engage said projections when the socket element is moved in one direction on said rod, the engaging portions of said socket element and said projections being shaped to cause said socket element to impart radial inward movement of said projections against said rod during movement of the socket element, thereby restricting or preventing longitudinal movement of said rod with respect to said support.

OLIVER P. CROUSE.